Oct. 15, 1963    R. R. HAGER ETAL    3,107,111
FASTENING MEANS FOR BALL-ENDED MEMBERS
Filed Aug. 12, 1960    2 Sheets-Sheet 1

ROBERT R. HAGER
DELBERT J. GARDNER
INVENTORS

BY
William J. Hickey
ATTORNEY

Oct. 15, 1963   R. R. HAGER ETAL   3,107,111
FASTENING MEANS FOR BALL-ENDED MEMBERS
Filed Aug. 12, 1960   2 Sheets-Sheet 2

ROBERT R. HAGER
DELBERT J. GARDNER
INVENTORS

BY *William P. Hickey*
ATTORNEY

United States Patent Office 3,107,111
Patented Oct. 15, 1963

3,107,111
FASTENING MEANS FOR BALL-ENDED MEMBERS
Robert R. Hager and Delbert J. Gardner, South Bend, Ind., assignors to The Bendix Corporation, South Bend, Ind., a corporation of Delaware
Filed Aug. 12, 1960, Ser. No. 49,218
1 Claim. (Cl. 287—126)

The present invention relates to means for connecting ball-ended rods to other members; and more particularly to improved means for connecting push rods to the pistons of master cylinders.

An object of the present invention is the provision of new and improved means for fastening a ball-ended rod into a receiving bore of another member by means of a single part that can be easily snapped into and out of place.

A further object of the invention is the provision of new and improved means of the above described type which is simple in design, rugged in construction, and inexpensive to manufacture.

Further objects and advantages of the invention will become apparent to those skilled in the art to which the invention relates from the following description of the preferred embodiment described with reference to the accompanying drawings forming a part of this specification, and in which.

Figure 1:
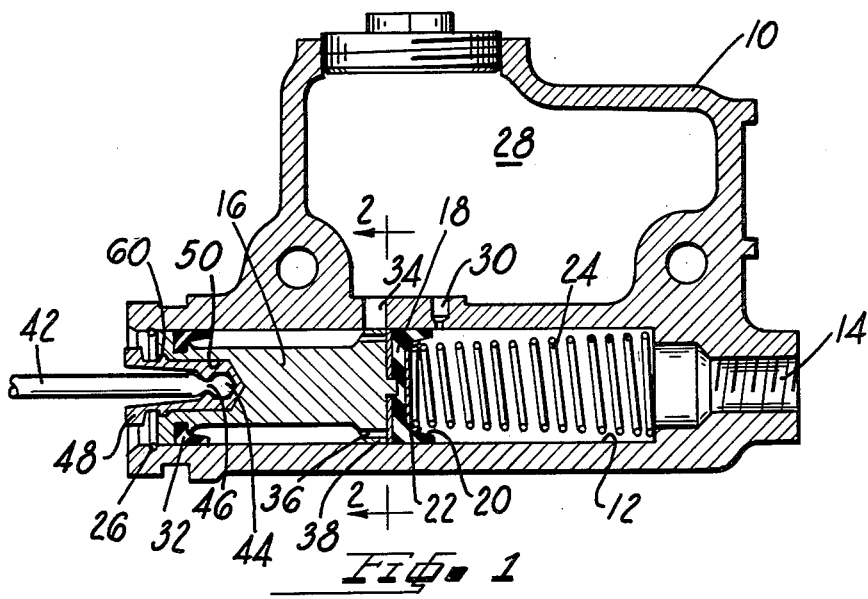
FIGURE 1 is a cross sectional view of a master cylinder embodying principles of the present invention.
Figure 2:
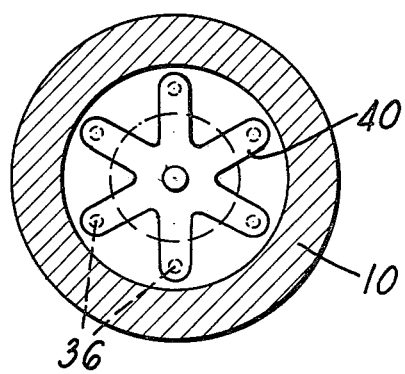
FIGURE 2 is a cross sectional view taken approximately on the line 2—2 of the FIGURE 1.
Figure 3:
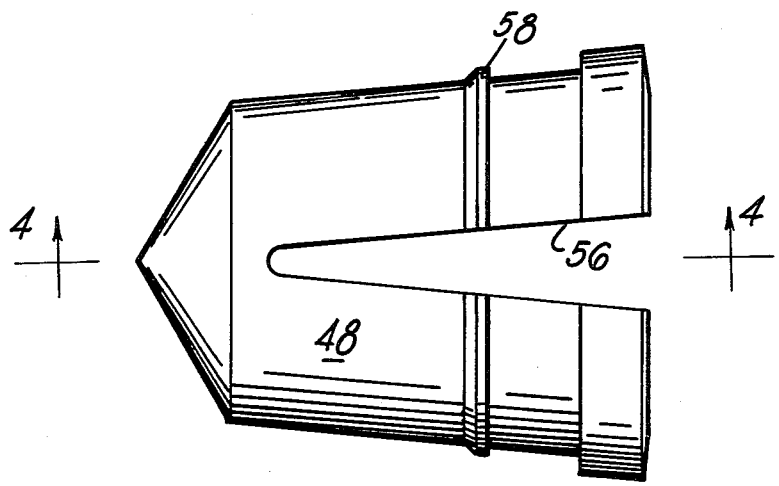
FIGURE 3 is a plan view of the push rod retainer seen in FIGURE 1.
Figure 4:
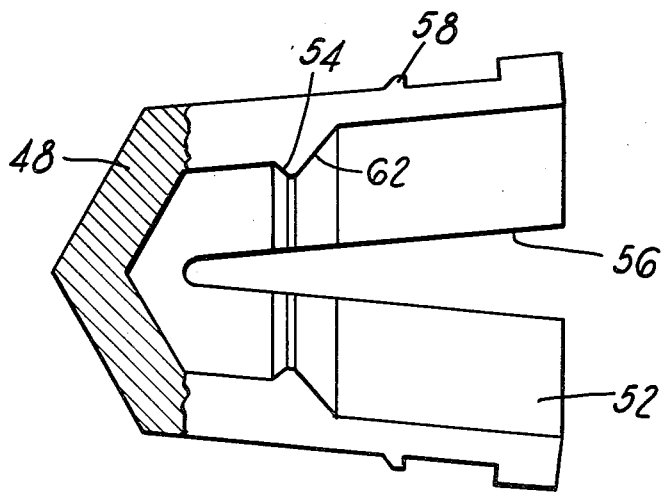
FIGURE 4 is a cross sectional view taken approximately on the line 4—4 of FIGURE 3.

The master cylinder shown in FIGURE 1 generally comprises a housing 10 having a longitudinally extending fluid pressurizing bore or chamber 12 therein from which fluid is forced out of its outlet 14 by means of a conventional spool shaped hydraulic piston 16. A conventional cup-shaped seal 18 is positioned against the inner end of the piston 16 with its lips 20 sealingly engaging the sidewalls of the bore 12 to thereby provide the units high pressure seal. Cup-shaped seal 18 is held in position against the piston 16 by means of a washer 22 and piston return spring 24; and outward movement of the piston 16 is limited by means of a snap ring 26 that is positioned in a suitable groove in the sidewalls of the bore 12 adjacent its outer end.

The master cylinder shown in the drawing is intended to operate the hydraulic braking system of an automotive vehicle; and in order to compensate for changes in volume in, or leakage from, the braking system, a reservoir of compensating fluid 28 is provided in the housing 10 in the region overlying the fluid pressurizing bore 12. A compensating port 30 connects the reservoir 28 with the bore 12 just forwardly, or inwardly, of the normal or retracted position of the lip of the seal 18 when the piston 16 is in abutment with the snap ring 26; and upon forward movement of the piston 16, the lip 20 of the seal 18 slides over the compensating port 30 to thereafter isolate the reservoir from the chamber 12 and force fluid out through the outlet 14. An annular seal 32 is positioned adjacent the rear flange of the piston 16 to prevent loss of fluid out of the bore 12; and a passage 34 in the housing 10 communicates the reservoir 28 with the portion of the bore 12 that is always positioned between the seals 18 and 32. A residual pressure check valve, not shown, is usually provided in the outlet 14 to restrict return flow from the braking system; and in order that a pumping action can be had when the seal 18 is inwardly of the compensating port 30, a plurality of openings 36 are provided through the front flange 38 of the piston 16. Fast rearward movement of the piston 16, as caused by quick release of the brake pedal of the vehicle, permits the piston return spring 24 to move the seal 18 rearwardly faster than fluid enters through the port 14 to thereby produce a pressure in the inner end of the bore 12 which is less than that in the reservoir 28. This reduction in pressure permits the lips 20 of the seal to be moved inwardly away from the sidewalls of the bore 12, to thereby allow flow of fluid through the openings 36 and around the periphery of the seal to the inner portion of the bore 12. If the piston 16 is again moved forwardly without moving the lip 20 rearwardly of the compensating port 30 the additional fluid which had previously passed around the outer periphery of the seal 18 will then be forced out through the outlet 14 into the braking system. In order that hydraulic pressure will not extrude the seal 18 through the openings 36, a thin metallic member 40 of approximately 6 thousandths of an inch thick is positioned between the seal 18 and the inner end of the piston 16 over the openings 36. The metallic member 40 has a plurality of fingers individual ones of which overlie individual ones of the openings 36, and the member 40 is held in place at its center by a suitable riveting structure.

The piston 16 is of course actuated by means of the usual push rod 42, which is suitably pivoted to the brake pedal lever not shown, and which is provided with the usual ball shaped end 44. The push rod has a narrow neck portion 46 between the ball shaped end and main portion of the rod 42 to permit suitable structure to engage the rear surface of the ball shaped end and hold it in place.

According to principles of the present invention, new and improved means are provided for attaching the ball end 44 of the push rod 42 to the piston 16. The means provided comprises a single bushing or retainer 48 which clamps upon the ball end 44 of the rod 42 and also retains itself in a receiving bore or chamber 50 in the outer end of the piston 16. The bushing or retainer 48 shown in the drawing is a generally cup-shaped structure whose open ended chamber 52 receives the ball end 44 of the push rod 42. The inner end of the chamber 52 is provided with suitable sidewall surfaces which engage and center the ball end 44 in the bushing 48, and is also provided with a suitable radially inwardly extending projection 54, hereinafter called a shoulder, which engages the spherical surfaces of the ball end 44 rearwardly of its major diameter and adjacent the neck 46 to prevent withdrawal out of the retainer 48. The shoulder 54 may be formed in sections, but is shown in the drawing as continuous except where broken by the slots 56—whose purpose will later be described. The bushing 48 in turn is held in the receiving bore 50 by means of radial projections 58 on its outer periphery, which also in the preferred embodiment shown in the drawing is formed as a continuous shoulder divided into portions by the slots 56, and which are received in a suitable groove 60 adjacent the outer end of the receiving bore 50.

It is intended that the bushing 48 will be snapped over the end of the ball end 42, and the bushing thereafter slipped into the receiving bore 50 in a manner which permits the shoulder or projections 58 to snap up into the groove 60. In the preferred embodiment shown in the drawing the central opening of the inner shoulder 54 is made smaller than the major diameter of the ball end 44; and the diameter of the outer shoulder 58 is formed so that it is normally larger than the inner diameter of the groove 60. The bushing 48 is preferably formed of a material which is bendable but not cold flowable, and has at least one axially extending slot 56 through its sidewalls so that the sidewalls can be bent together sufficiently to contract the shoulder 58 to the size of the receiving bore 50, and thereby permit insertion into the receiving bore 50. In the preferred embodiment shown in the drawing, four such slots 56 are provided; and when the bushing 48 is seated against the bottom of the receiving bore 50, radial inward force on the bushing 48 is released to permit the shoulder 58 to expand up into the receiving groove 60. In the preferred embodiment shown in the drawing, the slots 56 extend inwardly of the shoulder 54 to more easily permit the shoulder 54 to be expanded up over the end of the ball end 44, and at the same time permit the squeezing together of the bushing to force the shoulder 54 into more firm engagement with the rear spherical surfaces of the ball end 44. In the preferred embodiment shown in the drawing, the portions of the bushing just outwardly of the inner shoulder 54 are made thinner than the portions which receive the ball end 44 so as to provide greater retention of the shoulder 54 against the ball end 44, while at the same time being flexible enough to permit the necessary contraction of the outer shoulder 58. The outer shoulder 58 is preferably positioned some distance away from the inner shoulder 54 so that some bending of the sidewalls occurs between the two shoulders; and as a still further refinement, the axially outer surface 62 of the shoulder 54 is preferably tapered in a direction toward the outer shoulder 58, so that the force that is applied by the ball against the shoulder 54 will be transmitted by means of compression through the bushing to force the outer shoulder 58 more firmly into the receiving groove 60. While the bushing 48 could of course be made of metal which is both bendable and non-flowing, it is preferably molded from a non-cold flowable plastic such as nylon or Delrin so as to eliminate lubricating problems, metal to metal clicking noises, and at the same time being very inexpensively produced. The retainer 48 could of course be made with generally cylindrical outer surfaces; but, as shown in the drawing, is preferably molded with tapered outer surfaces so as to provide more spring action for forcing the outer shoulder 58 into the receiving groove 60. It has been found that a bushing molded of nylon in the general configuration shown in the drawing will retain the conventional push rod of a master cylinder to its internal piston so tenaciously that a force of more than two hundred pounds is required to rip the push rod out of the piston's receiving bore.

If at any time it is desired to disconnect the push rod 42 from the piston 16, the outer end of the bushing 48 can be collapsed to move the shoulder 58 out of the receiving groove 60, and thereby permit the easy withdrawal of the retainer 48 out of the receiving bore 50. Thereafter the sides of the bushing 48 can be expanded radially outwardly and the ball end 44 of the push rod easily withdrawn through the expanded central opening of the inner shoulder 54.

It will be apparent that the objects heretofore enumerated as well as others have been achieved; and that there has been provided a means for attaching a ball-ended member to another member by a single part which can be easily and inexpensively molded, and by reason of which the push rod can be easily connected to or disassembled from the other member.

While the objects heretofore enumerated have been accomplished, I do not wish to be limited to the particular construction shown and described; and it is my intention to cover hereby all novel adaptations, modifications and arrangements thereof which come within the practice of those skilled in the art to which the invention relates and which comes within the purview of the following claim.

I claim:

An assembly comprising:

a first member having an open ended chamber in one end thereof with fixed generally cylindrical sidewalls, said sidewalls having a groove therein spaced inwardly from the open end of said chamber;

a rod having a ball end, said ball end being connected to said rod by neck portions whose cross sectional diameter is less than said rod and said ball end;

a cup-shaped bushing having an open end chamber formed between tapered, cylindrical sidewalls, said taper of said sidewalls increasing towards said open end, said bushing being normally longer than said chamber of said first member and of a larger external diameter adjacent said open end of said bushing than the chamber of said first member, said tapered sidewalls of said bushing having a tapered slot decreasing in width inwardly of said open end of said bushing;

a radial projection formed on the periphery of said tapered sidewalls spaced inwardly from said open end to engage said groove in said first member chamber sidewalls when said bushing is inserted in said first member's chamber until bottoming therein leaving a portion of said bushing projecting from said chamber of said first member; and a depending projection in said chamber of said bushing, which depending projection is spaced from a rear wall of said chamber in said bushing to abut a rear face of said ball end and surround said neck portion to hold said rod to said bushing.

References Cited in the file of this patent
UNITED STATES PATENTS

| | | |
|---|---|---|
| 151,861 | Drew | June 9, 1874 |
| 936,453 | Hinkens | Oct. 12, 1909 |
| 2,533,626 | Reiter | Dec. 12, 1950 |
| 2,784,987 | Corcoran | Mar. 12, 1957 |